US011274500B2

(12) United States Patent
Pusard

(10) Patent No.: US 11,274,500 B2
(45) Date of Patent: Mar. 15, 2022

(54) PRESSURE TEST PLUG FOR IMPROVED TUBULAR THREADED COMPONENT

(71) Applicant: VALLOUREC OIL AND GAS FRANCE, Aulnoye-Aymeries (FR)

(72) Inventor: Mickael Pusard, Vandoncourt (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 1044 days.

(21) Appl. No.: 15/757,789

(22) PCT Filed: Sep. 7, 2016

(86) PCT No.: PCT/EP2016/071102
§ 371 (c)(1),
(2) Date: Apr. 9, 2019

(87) PCT Pub. No.: WO2017/042226
PCT Pub. Date: Mar. 16, 2017

(65) Prior Publication Data
US 2020/0056431 A1 Feb. 20, 2020

(30) Foreign Application Priority Data
Sep. 7, 2015 (FR) ........................... 1558271

(51) Int. Cl.
*F16L 55/115* (2006.01)
*E21B 17/00* (2006.01)
(Continued)

(52) U.S. Cl.
CPC .......... *E21B 17/006* (2013.01); *E21B 17/042* (2013.01); *F16L 15/003* (2013.01);
(Continued)

(58) Field of Classification Search
CPC ..... F16L 55/152; F16L 15/003; F16L 15/008; F16L 55/1152; G01M 3/022;
(Continued)

(56) References Cited
U.S. PATENT DOCUMENTS 1,888,988 A * 11/1932 Kirby .................... F16L 15/008
285/115
2,086,133 A * 7/1937 Kennedy ............... F16L 15/008
285/349
(Continued)

FOREIGN PATENT DOCUMENTS

| CN | 1678861 A | 10/2005 |
|---|---|---|
| CN | 101297185 A | 10/2008 |

(Continued)

OTHER PUBLICATIONS

International Search Report dated Oct. 24, 2016 in PCT/EP2016/071102 (with English translation), 9 pages.

(Continued)

*Primary Examiner* — David Bochna
(74) *Attorney, Agent, or Firm* — Oblon, McClelland, Maier & Neustadt, L.L.P.

(57) ABSTRACT

A plug for a pressure test configured for a tubular component, the tubular component including a male threaded element at a free end, the male threaded element including a male thread and a sealing surface, the plug including a thread compatible with the male thread, an inner annular groove, and a sealing ring held in the groove such that the sealing ring is radially compressed between an outer periphery of the male threaded element and a bottom of the inner annular groove.

14 Claims, 3 Drawing Sheets

(51) Int. Cl.
*E21B 17/042* (2006.01)
*F16L 15/00* (2006.01)
*F16L 55/07* (2006.01)

(52) U.S. Cl.
CPC ............. *F16L 15/004* (2013.01); *F16L 55/07* (2013.01); *F16L 55/1152* (2013.01)

(58) Field of Classification Search
CPC ............. G01M 3/2861; G01M 3/2853; G01M 3/2815; G01M 3/2807
USPC ................. 138/96 T; 73/46, 49.1, 49.5, 49.8
See application file for complete search history.

(56) References Cited

U.S. PATENT DOCUMENTS

| | | | | |
|---|---|---|---|---|
| 2,663,183 | A | * 12/1953 | Huhn | .................. G01M 3/2853 73/46 |
| 3,559,459 | A | * 2/1971 | Forman | ............... G01M 3/2853 73/46 |
| 4,407,171 | A | 10/1983 | Hasha et al. | |
| 4,770,448 | A | * 9/1988 | Strickland | ............. E21B 17/042 285/333 |
| 4,926,680 | A | * 5/1990 | Hasha | ................... G01M 3/223 73/46 |
| 5,505,502 | A | 4/1996 | Smith et al. | |
| 7,581,766 | B2 | 9/2009 | Verger et al. | |
| 2005/0087983 | A1 | 4/2005 | Verger et al. | |
| 2006/0006600 | A1 | 1/2006 | Roussie | |
| 2007/0029798 | A1 | 2/2007 | Adorni | |
| 2008/0223113 | A1 | 9/2008 | Dutilleul | |

FOREIGN PATENT DOCUMENTS

| | | |
|---|---|---|
| EA | 200500102 A1 | 6/2005 |
| EP | 1 924 832 A1 | 5/2008 |
| EP | 2 212 510 A1 | 8/2010 |
| FR | 2 844 023 A1 | 3/2004 |
| WO | WO 2011/043689 A1 | 4/2011 |
| WO | WO 2013/108931 A1 | 7/2013 |

OTHER PUBLICATIONS

European Office Action dated Jun. 18, 2020 in European Patent Application No. 16 769 885.1, 7 pages.
Combine Russian Federation Office Action and Search Report dated Jan. 20, 2020 in Russian Federation Patent Application No. 2018107924/28(012233) (submitting English translation only), 6 pages.

* cited by examiner

PRESSURE TEST PLUG FOR IMPROVED TUBULAR THREADED COMPONENT

BACKGROUND

The invention relates to a plug for conducting pressure tests on a tubular component and, more particularly, for tests intended to be conducted on tubular components provided at one of their ends with a threaded portion and with a sealing portion.

In order to make up production strings, casing tubing strings or drill rod strings for oil wells or similar wells, so-called superior (or premium) tubular threaded joints have been developed. A premium threaded joint is formed by the collaboration between a male premium threaded end of a first tubular component and a female premium threaded end of a second tubular component.

A male premium threaded end comprises a screw thread, a free end, a sealing surface formed between the screw thread and the free end, it being possible for the sealing surface to be at a non-zero distance away from said free end. An annular lip may be provided between the screw thread and the sealing surface and/or between the sealing surface and the free end. The sealing surface is intended to collaborate with a complementary sealing surface of a female premium threaded end via a metal-to-metal interference. The free end may form an axial screwing stop. The sealing surface and the complementary sealing surface may have different profiles, notably in an example in which one of these surfaces develops a frustoconical surface whereas its counterpart develops a toric surface.

Because these threaded joints are qualified in their own right, and their performance has been established, it is necessary to be able to test the performance, and notably the pressure strength, of the tubular component itself, independently of the joint. The invention is more particularly of use in conducting such tests, making it possible to guarantee that the tests will have no consequence on the premium threaded end. This is because it would be damaging to confirm the quality of the tube while losing the sought-after quality of the premium threaded end it comprises.

A tubular component that is to be tested, which is to be subjected to an interior pressure sealing test, may for example be an accessory (safety valve, string hanger, string section reducer), or a tubular subassembly intended to be inserted by screwing into a tubular string of an oil well. The tests may be carried out using water, gas or alternatively using other fluids, for example an oil.

In the prior art, documents U.S. Pat. Nos. 2,663,183 and 4,407,171 disclose plugs for conducting such leak tests intended to collaborate with female threaded portions, these threaded portions not being premium portions as described hereinabove.

Moreover, document EP-1924832 discloses a test method suited to male and female premium threaded ends allowing tests to be conducted at very high pressures. That document notably teaches screwing a combination plug onto a male screw thread of the end so as to axially compress a sealing ring of the plug between an axial stop belonging to the end and the bottom of the plug, so as then to establish a test pressure inside the component bearing said threaded end. Although satisfactory, this type of plug does not allow tests to be conducted on all types of premium threaded end. In particular, when such a plug is used on a male threaded end of the type taught in documents EP-2212510 and WO-2013/108931, the leaks across the joint are significant.

BRIEF SUMMARY

The object of the invention is to provide a test solution that is satisfactory, both for premium threaded portions that have no axial stop and also that is suited to premium threaded portions the axial stop of which is configured in such a way as to offer a leakage path. As an alternative to the standard search for an optimum compromise between the hardness and elasticity properties of the sealing rings, it has been an objective of the invention to offer a novel and effective solution to the stated problem, without generating additional cost.

The invention therefore relates to a plug for pressure testing suitable for a tubular component, the tubular component comprising at a free end a male threaded element, such that the male threaded element comprises a male screw thread and a sealing surface, the plug comprising a compatible screw thread compatible with the male screw thread, an interior annular groove and a sealing ring held in said groove such that the sealing ring is compressed radially between an exterior periphery of the male threaded element and a bottom of said interior annular groove.

In particular, said annular groove may be positioned, in the position of assembly with said tubular component, facing a portion situated between the male screw thread and the free end, notably a non-zero distance away from the male screw thread.

For preference, said annular groove may be positioned, in the position of assembly with said tubular component, facing a portion situated between the sealing surface and the free end.

In particular, a bottom of this groove may have a frustoconical surface portion. Said bottom may have an inclination identical to that of a lip situated between a frustoconical portion bearing the sealing surface and the free end, this lip having an inclination less than that of the frustoconical portion. These features make it possible to improve the uniformity of the compression of the sealing ring.

Advantageously, the sealing ring may have a first section comprising a radially interior periphery and a radially exterior periphery, the peripheries notably being concentric and homothetic. In such a configuration, the inclination of the concentric interior and exterior peripheries of the first section may be identical to that of the lip.

In particular, the annular groove may be positioned, in the position of assembly with said tubular component, facing the frustoconical portion in part on the sealing surface.

For example, the sealing ring may comprise a second section respectively comprising a radially interior periphery and a radially exterior periphery such that the radially interior periphery of this second section has an inclination identical to that of the frustoconical portion bearing the sealing surface.

The sealing ring may also comprise a third section having a chamfered interior periphery serving as a poka-yoke feature for the correct positioning of the ring in the groove. This chamfered interior periphery also makes it possible to ensure better engagement of the tubular component in the plug thereby also making it possible to prevent the free end of the tubular component from dislodging the sealing ring from its groove.

Advantageously, the plug may comprise a frustoconical interior surface between the compatible screw thread and the groove such that this frustoconical interior surface is at a non-zero diametral distance, for example a distance of more than 0.05 mm, away from the sealing surface, facing which said frustoconical interior surface is situated in the assembled position. The existence of this non-zero diametral distance makes it possible to limit the expansion of the end of the tubular component when pressurized, and also makes it possible to avoid contact between the tubular component that is to be tested and the plug during the screwing and unscrewing of the plug. The frustoconical interior surface offers a static support surface for the sealing surface of the male threaded element.

According to one embodiment, the sealing ring may be made from a material of a hardness comprised between 90 and 100 Shore A, notably of polyurethane or of Teflon®.

To aid with fitting and assist with identifying an end of screwing of the plug onto the threaded element, the plug may comprise an interior axial stop surface to come into contact with the free end of the tubular component.

More specifically, in instances in which the male screw thread is of the trapezoidal type, then the compatible screw thread is also of the trapezoidal type, but may be distinct from a complementary screw thread of this male screw thread insofar as collaboration between the male screw thread and the compatible screw thread creates no radial interference between the thread roots and crests of said male screw thread. The use of a screw thread that is compatible, rather than complementary, makes it possible to preserve the integrity of the screw thread while the test is being conducted.

More particularly, and given the pressure at which the tests are conducted, the compatible screw thread and the groove may advantageously be formed in a metallic body of the plug.

The advantage of the solution of the invention is that it provides a plug that can be reused and that is easy to screw on by hand.

BRIEF DESCRIPTION OF THE DRAWINGS

The present invention will be better understood from studying the detailed description of one embodiment considered by way of entirely nonlimiting example and illustrated by attached drawings in which.

DETAILED DESCRIPTION

Figure 1:
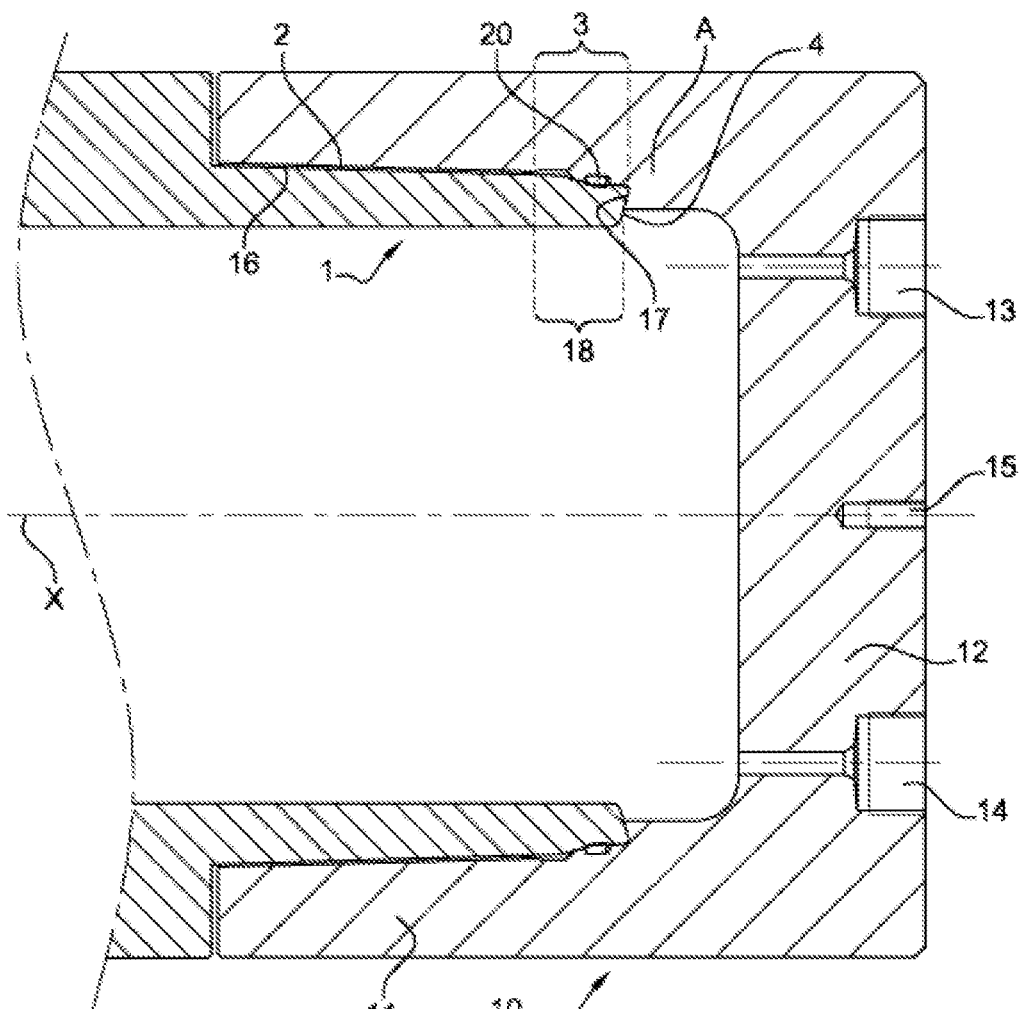
FIG. 1 is a view in longitudinal section of a plug according to the invention assembled with a tubular component that is to be pressure tested.
Figure 5:
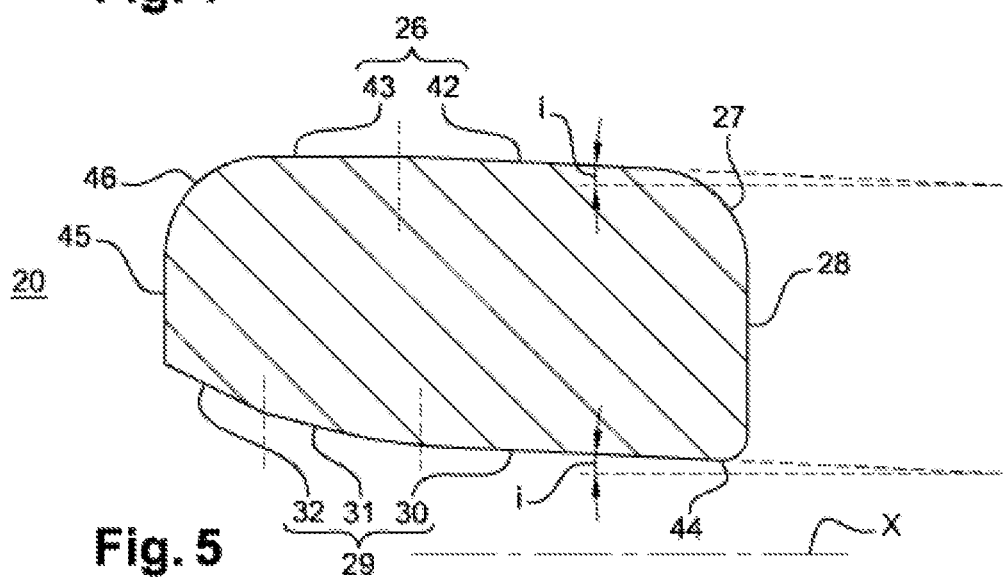
FIG. 5 is a view in longitudinal section of the sealing ring of a plug according to the invention.

FIG. 1 depicts a male threaded element 1 of a tubular component that is to be pressure tested. The tubular component is depicted here as being hollow. Although this is not detailed in FIG. 1, the tubular component is open at its two axially opposite ends, relative to an axis of revolution X of said tubular component. In that case, in order to conduct a pressure test, it is necessary for the second end also to be blanked off in a sealed manner, for example using a plug according to the invention.

This male threaded element 1 is provided with a tapered male screw thread 2 and with a non-threaded zone 3 positioned beyond the screw thread 2 when progressing toward a free end 4 of the threaded element 1. The screw thread 2 is intended for later assembly with another tubular component in a string of tubes that is to be used in an oil well.

Figure 2:
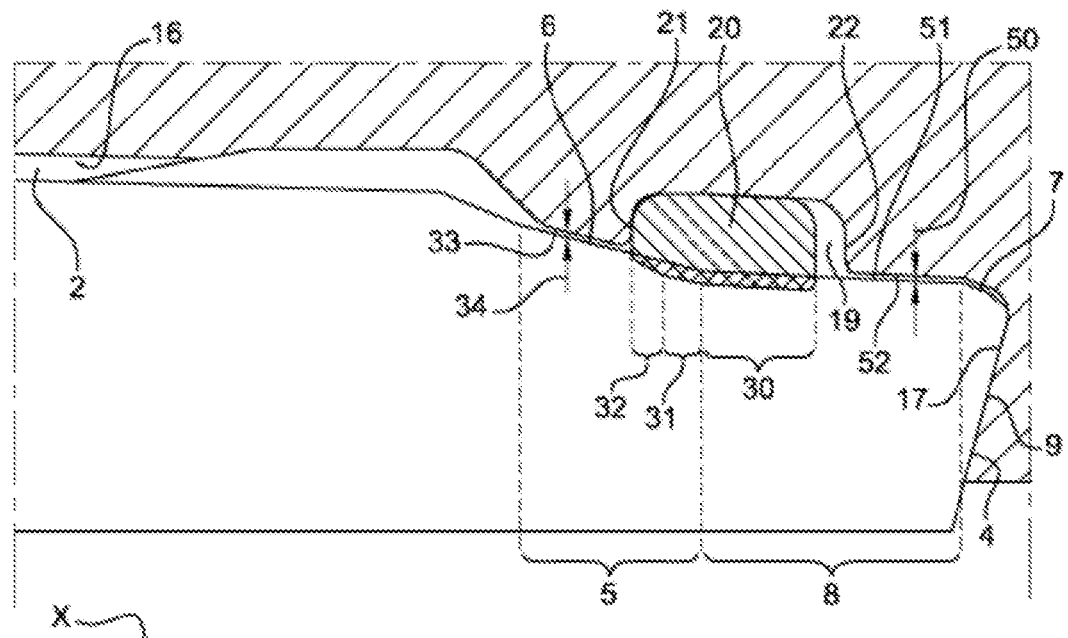
FIG. 2 is a view of detail A of FIG. 1.

The radially external surface of the non-threaded zone 3 comprises, in FIG. 2, between the screw thread 2 and the free end 4, a frustoconical part 5 bearing a sealing surface 6. The sealing surface 6 is intended to interfere with a complementary surface in order to create a metal-to-metal seal when the tubular component to be tested is assembled with a complementary tubular component. Between the frustoconical part 5 and the free end 4 the radially external surface of the threaded element 1 comprises an annular lip 8 and a nose 7. The annular lip 8 may be cylindrical or frustoconical but in the latter instance, the inclination of the frustoconical portion of the lip is less than the inclination of the frustoconical part 5. The nose 7 provides the connection with an end surface 9 of the free end 4, this end surface 9 forming an axial stop surface when the component is assembled with a complementary component.

FIG. 1 also shows a test plug 10 intended to isolate the interior space of the component that is to be pressure tested. This plug 10 comprises a body forming a substantially tubular wall 11 intended to be mounted around the male threaded element 1. The body of the plug is preferably made of metal. The plug 10 also comprises a transverse bottom 12 transverse to the tubular wall. An inlet 13 and an outlet 14 for pressurized fluid pass through the bottom.

Figure 3:
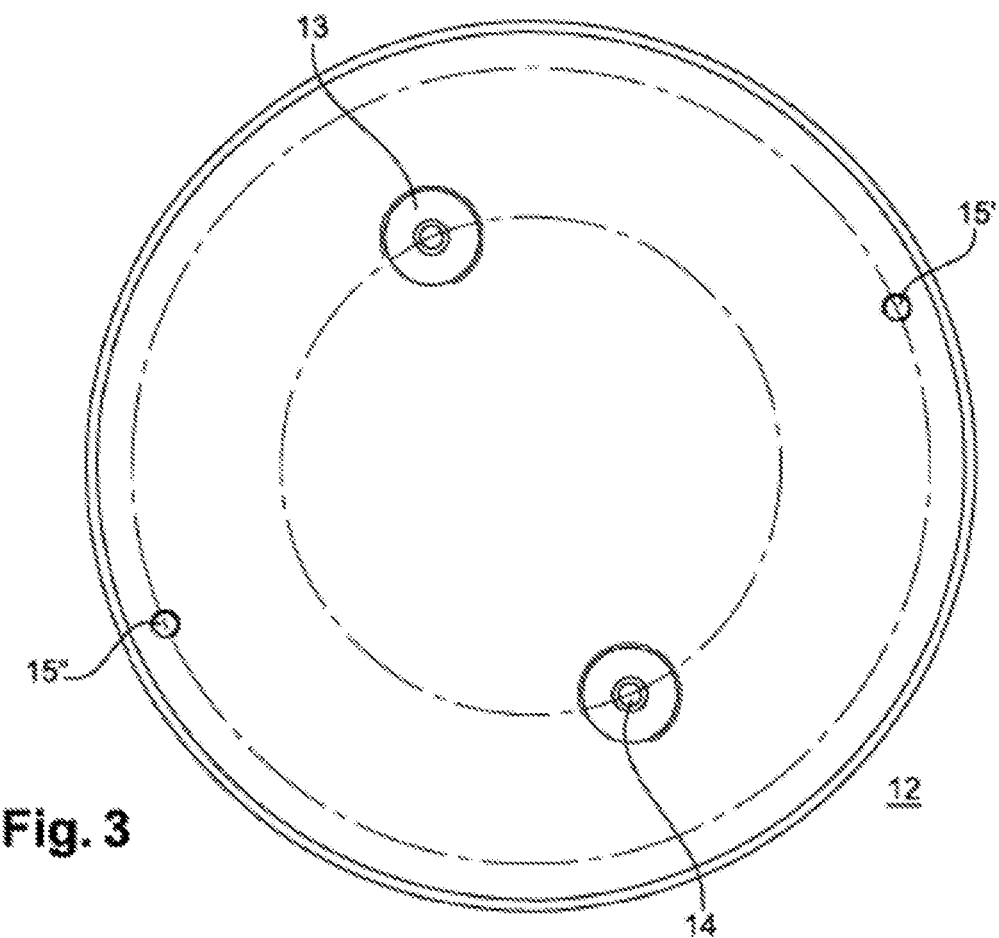
FIG. 3 is a view of a plug according to the invention, from above.

The transverse bottom 12 is also provided externally with at least one anchor point 15. According to FIG. 3, the bottom 12 comprises two anchor points 15' and 15", in this instance diametrically opposed, and situated some distance from the center of this bottom 12 so as to avoid creating a region of weakness and so as to allow a lifting tool to be fixed into these anchor points.

The tubular wall 11 is equipped on its interior periphery with a tapered female screw thread 16. The female screw thread 16 is compatible with the male screw thread 2 so as to allow the plug 10 to be screwed onto the element 1 by hand, for example using a chain wrench that provides a screwing torque of less than 1000 N·m, preferably of around 200 N·m.

The tubular wall 11 comprises an internal step forming an interior annular shoulder 17. The interior annular shoulder 17 of the plug is intended to collaborate by way of an end-of-screwing stop with the stop surface 9. The shoulder 17 is substantially of the same cone angle as the stop surface 9, which comes to face it during screwing as can be seen in FIG. 2. The shoulder 17 may enter into an interaction with just a fraction of the stop surface 9, inasmuch as the positioning of the plug 10 on the threaded element 1 does not require overtorqueing of the screwing.

Between this interior annular shoulder 17 and the compatible screw thread 16 the tubular wall 11 comprises a section 18. An annular groove 19 opening onto the inside of the plug is formed in the section 18. A sealing ring 20 is added into the groove 19. The sealing ring 20 projects radially inward with respect to the front 21 and rear 22 flanks of the groove, the projection being localized between these front 21 and rear 22 flanks. The sealing ring 20 has a thickness greater than the radial depth of the groove. The groove has an axial dimension, along the axis X, which is also the axis of revolution of the plug, that is greater than the axial dimension of the sealing ring relative to the same axis. The axial clearance of the sealing ring 20 in the groove 19 makes it possible to provide a clearance that makes it easier to fit the ring into and remove it from its groove. This axial clearance also makes it possible to absorb dimensional variations of the ring with respect to the manufacturing tolerances on the ring and the machining tolerances on the groove. Finally, this axial clearance makes it possible to tolerate axial expansion of the ring when the latter is placed under radial compression at the end of the screwing-together of the tubular component that is to be tested and said plug.

Figure 4:
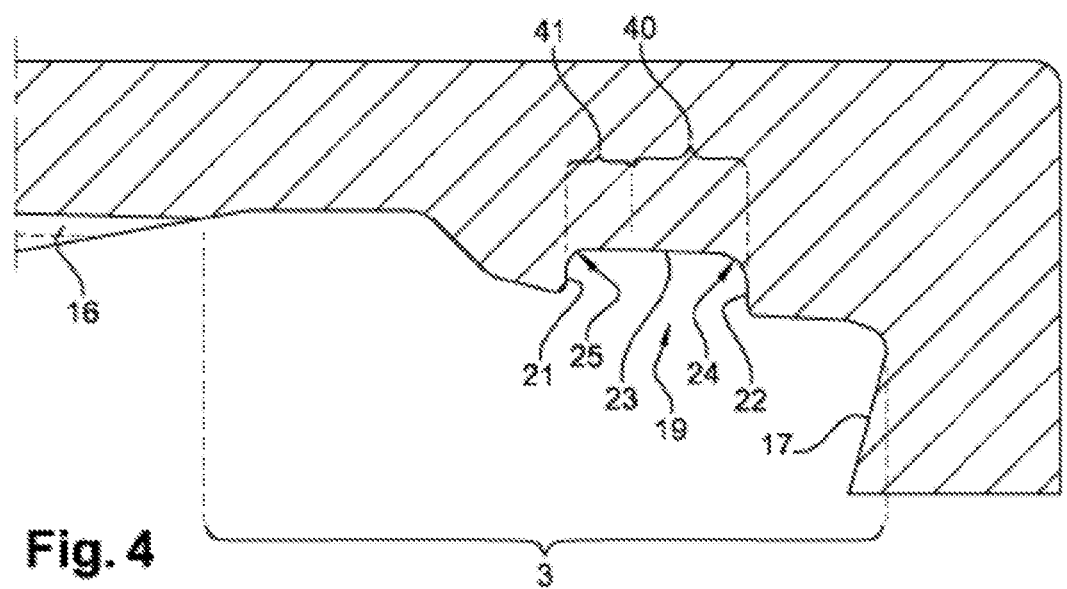
FIG. 4 is a view of detail A of the plug according to the invention without the sealing ring.

In FIG. 4, the front 21 and rear 22 flanks stand up from a bottom 23 of the groove 19 in a plane substantially perpendicular to the axis X. The bottom 23 of the groove has a frustoconical surface portion 40, of an inclination "i" with respect to the axis X, and connected to the rear flank 22 by a first fillet-radiused portion 24. The frustoconical surface portion 40 may represent the entire bottom wall 23 as far as the front flank 21. However, in the example depicted, and for the purpose of making the groove easier to machine, the frustoconical surface portion 40 represents only part of the bottom 23, the bottom 23 comprising a cylindrical portion 41 in the continuation of the frustoconical surface portion 40, this cylindrical portion 41 connecting to the front flank 21 by a second fillet-radiused portion 25. The first filletradiused portion 24 has a greater radius of curvature than the fillet-radiused portion 25 so as to limit the concentration of stresses at this point when the test is being conducted.

For practical reasons, the cylindrical portion 41 may extend over an axial distance that is fixed, whatever the size of the plug, for example of the order of 2.5 mm.

The sealing ring 20 has a radially exterior periphery 26 comprising an inclined portion 42, here with the same inclination "i" as that of the frustoconical portion 40 of the bottom 23. In order to collaborate uniformly with the bottom, inasmuch as the pressure test is going to make the sealing ring 20 be pushed back toward the front flank 21 of the groove, the radially exterior periphery 26 comprises a cylindrical portion 43 to collaborate with the cylindrical portion 41 of the bottom 23.

The inclined portion 42 of the radially exterior periphery 26 is connected by a first fillet-radiused portion 27 to a first transverse face 28 transverse to the axis of revolution of the ring, which has the virtue of coinciding with the axis X in the assembled position. The first transverse face 28 is connected to a radially interior periphery 29 of the ring. The radially interior periphery 29 can be broken down into three successive portions 30, 31 and 32. The portions 30, 31 and 32 are such that the inclination of the first portion 30 is smaller than that of the second portion 31 which is itself smaller than that of the third portion 32.

The first portion 30 is connected by a fillet radius 44 to the first transverse face 28. It has an inclination which is substantially of the same value as the inclination "i" of the inclined portion 42 of the radially exterior periphery 26. This inclination "i" is chosen to be substantially equal to the inclination of the portion of the lip 8 facing which this portion 30 is positioned in the assembled position. The portion 30 is configured to undergo isotropic and uniform pressure stress.

The break in slope between the first portion 30 and the second portion 31 is configured to be situated at the junction between the frustoconical portion 5 and the lip 8, so as to limit the translational movement of the ring. The slope of the second portion 31 is substantially equal to that of the frustoconical portion 5 so as to allow uniform compression of the sealing ring 20.

The break in slope between the second portion 31 and the third portion 32 also acts as a visual poka-yoke feature for correct insertion of the sealing ring into the groove 19. The third portion 32 is connected to a second transverse face 45, parallel to the first transverse face 28, which connects to the cylindrical portion 43 of the radially exterior periphery 26. The fillet radius 46 between the second transverse face 45 and the cylindrical portion 43 is greater than that of the second fillet-radiused portion 25 so as to absorb dimensional variations connected with the respective machining tolerances between the groove 19 and the sealing ring 20.

In the assembled position, as can be seen in FIG. 2, the ring portion which is depicted in the material of the element 1 is in practice completely contained within the volume defined between the exterior periphery of the male element 1 and the bottom 23 of the groove. The superposed part corresponds to the actual compression absorbed by the material of the sealing ring 20 and which notably leads to its axial deformation in the groove 19. In this position, the sealing ring 20 is compressed radially, for example to the extent of 20%, so as to guarantee the sealing of the assembly of the plug and the component that is to be tested.

The front flank 21 connects to a frustoconical interior surface 33 designed to be placed, in the assembled position, facing the sealing surface 6. Before the start of the test, there is a clearance 34 between the sealing surface 6 and the frustoconical interior surface 33 adjacent to the groove 19. The clearance 34 is small enough to prevent the sealing ring from creeping into this space. Furthermore, this clearance 34 is enough that, under the effect of the test pressure, the sealing surface 6 comes to bear against said facing surface practically without experiencing any plastic deformation.

What is meant by "practically without having experienced any plastic deformation" is disregarding a small amount of plastic deformation which could be detected by sensitive measurement means but which would not have any impact on the characteristics of use of the component concerned.

The clearance 34 has a value at least equal to 0.05 mm in terms of diametral clearance. Said value may represent a diametral clearance of at most 0.3% of the nominal outside diameter of the tubular component. The clearance may be 0.2 mm at most.

A similar clearance 50, notably of radial size identical to the clearance 34, may also be created between the portion 51 of the lip 8 and the nose 7 which lies radially facing an internal tubular wall 52 of the plug. The clearance 50 also makes it possible to limit the radial expansion of the male threaded end tested.

Figure 6:
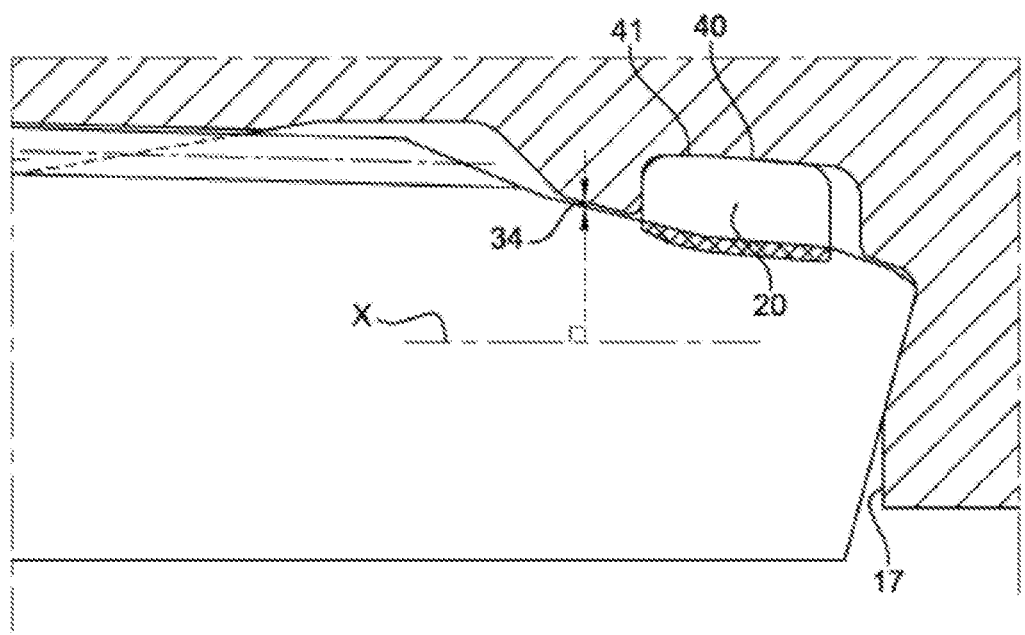
FIG. 6 is a detail view, in longitudinal section, of an alternative form of embodiment of a plug according to the invention assembled with a tubular component that is to be pressure tested.

An alternative form of embodiment of a plug according to the invention is depicted in FIG. 6. In this alternative form, the lip 8 is short to the extent that the entirety of the lip 8 faces the groove 19. The groove 19 is even partially facing part of the nose 7. In this configuration, and to make radial machining operations easier, the annular shoulder 17 is truncated, and thus offers a smaller area of contact with the free end 4 than that provided in the first embodiment described particularly in FIGS. 1 and 2.

The invention claimed is:

1. A plug for pressure testing configured for a tubular component, the tubular component including at a free end a male threaded element, and the male threaded element including a male screw thread and a sealing surface, the plug comprising:

a compatible screw thread compatible with the male screw thread;

an interior annular groove; and a sealing ring held in the annular groove such that the sealing ring is compressed radially between an exterior periphery of the male threaded element and a bottom of the annular groove, wherein the bottom of the annular groove has an inclination identical to that of a lip situated between a frustoconical portion bearing the sealing surface and the free end, the lip having an inclination less than that of the frustoconical portion.

2. The plug as claimed in claim 1, wherein the annular groove is positioned, in a position of assembly with the tubular component, facing a portion situated between the male screw thread and the free end, at a non-zero distance away from the male screw thread.

3. The plug as claimed in claim 1, wherein the annular groove is positioned, in a position of assembly with the tubular component, facing a portion situated between the sealing surface and the free end.

4. The plug as claimed in claim 1, wherein a bottom of the annular groove comprises a frustoconical surface portion.

5. The plug as claimed in claim 1, wherein the sealing ring includes a first section including a radially interior periphery and a radially exterior periphery, the peripheries being concentric and homothetic.

6. The plug as claimed in claim 5, wherein the inclination of the concentric interior and exterior peripheries of the first section is identical to that of the lip.

7. The plug as claimed in claim 1, wherein the annular groove is positioned, in a position of assembly with the tubular component, facing the frustoconical portion, in part on the sealing surface.

8. The plug as claimed in claim 7, wherein the sealing ring includes a second section respectively including a radially interior periphery and a radially exterior periphery such that the radially interior periphery of the second section has an inclination identical to that of the frustoconical portion bearing the sealing surface.

9. The plug as claimed in claim 8, wherein the sealing ring includes a third section having a chamfered interior periphery.

10. The plug as claimed in claim 1, further comprising a frustoconical interior surface between the compatible screw thread and the annular groove such that the frustoconical interior surface is at a non-zero diametral distance away from the sealing surface, facing which the frustoconical interior surface is situated in the assembled position.

11. The plug as claimed in claim 1, wherein the sealing ring is made from a material of a hardness between 90 and 100 Shore A, or of polyurethane, or of Teflon®.

12. The plug as claimed in claim 1, further comprising an interior axial stop surface to come into contact with the free end of the tubular component.

13. The plug as claimed in claim 1, wherein the male screw thread is of trapezoidal type, and the compatible screw thread is distinct from a complementary screw thread of the male screw thread insofar as collaboration between the male screw thread and the compatible screw thread creates no radial interference between thread roots and crests of the screw threads.

14. The plug as claimed in claim 1, wherein the compatible screw thread and the groove are formed in a metallic body of the plug.

* * * * *

UNITED STATES PATENT AND TRADEMARK OFFICE
CERTIFICATE OF CORRECTION

PATENT NO. : 11,274,500 B2
APPLICATION NO. : 15/757789
DATED : March 15, 2022
INVENTOR(S) : Mickael Pusard It is certified that error appears in the above-identified patent and that said Letters Patent is hereby corrected as shown below:

In the Specification

In Column 5, Line 29, insert --second-- before "fillet-radiused."

Signed and Sealed this
Second Day of August, 2022

Katherine Kelly Vidal
*Director of the United States Patent and Trademark Office*